US009240982B2

(12) United States Patent
Slick et al.

(10) Patent No.: US 9,240,982 B2
(45) Date of Patent: Jan. 19, 2016

(54) METHOD FOR ASSOCIATING AN IMAGE-FORMING DEVICE, A MOBILE DEVICE, AND A USER

(71) Applicants: Canon Information and Imaging Solutions, Inc., Melville, NY (US); Canon U.S.A., Inc., Melville, NY (US)

(72) Inventors: Royce E. Slick, Mission Viejo, CA (US); Manuel Ferreira, Long Beach, CA (US); Craig Mazzagatte, Aliso Viejo, CA (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 14/142,442

(22) Filed: Dec. 27, 2013

(65) Prior Publication Data
US 2015/0188896 A1 Jul. 2, 2015

(51) Int. Cl.
H04L 29/06 (2006.01)
H04W 12/04 (2009.01)
H04W 12/06 (2009.01)

(52) U.S. Cl.
CPC .......... H04L 63/061 (2013.01); H04L 63/0428 (2013.01); H04L 63/08 (2013.01); H04W 12/04 (2013.01); H04W 12/06 (2013.01)

(58) Field of Classification Search
CPC ............ G06F 21/6263; H04L 63/0435; H04L 63/0823; H04L 63/0869; H04L 63/166
See application file for complete search history.

(56) References Cited

U.S. PATENT DOCUMENTS

| 6,772,331 | B1 * | 8/2004 | Hind et al. | 713/151 |
| 7,814,320 | B2 | 10/2010 | Mackenzie et al. | |
| 2002/0078354 | A1 * | 6/2002 | Sandhu et al. | 713/171 |
| 2003/0084292 | A1 * | 5/2003 | Pierce et al. | 713/168 |
| 2004/0168055 | A1 * | 8/2004 | Lord et al. | 713/156 |
| 2007/0136800 | A1 | 6/2007 | Chan et al. | |
| 2010/0005294 | A1 | 1/2010 | Kostiainen et al. | |
| 2010/0262829 | A1 | 10/2010 | Brown et al. | |
| 2010/0278342 | A1 * | 11/2010 | Pering et al. | 380/270 |
| 2011/0085196 | A1 | 4/2011 | Liu et al. | |
| 2011/0211700 | A1 | 9/2011 | Park et al. | |

(Continued)

OTHER PUBLICATIONS

"Print to any printer from your mobile device," downloaded on Apr. 18, 2012 from http://www.roiprintmanager.com/documents/ROI%20Mobile%20Print%20Brochure.pdf.

(Continued)

Primary Examiner — Hadi Armouche
Assistant Examiner — Cheng-Feng Huang
(74) Attorney, Agent, or Firm — Canon U.S.A., Inc., IP Division

(57) ABSTRACT

Systems, methods, and devices for associating an image forming device and a mobile device receive, at a first device, a request to establish a connection with a second device; generating an optically-readable code that encodes a first set of data, wherein the first set of data includes first key-derivation data; display the optically-readable code of the first set of data; establish a communication channel with the second device; receiving a second set of data from the second device via the established communication channel, wherein the second set of data includes second key-derivation data, and wherein the second key-derivation data is generated in response to receiving the first key-derivation data at the second device; and determine the common key from the first key-derivation data and the second key-derivation data.

9 Claims, 5 Drawing Sheets

(56) References Cited

U.S. PATENT DOCUMENTS

| | | | |
|---|---|---|---|
| 2011/0231650 A1* | 9/2011 | Coulier | 713/151 |
| 2013/0031261 A1 | 1/2013 | Suggs | |
| 2013/0145153 A1* | 6/2013 | Brown et al. | 713/156 |
| 2013/0145165 A1* | 6/2013 | Brown et al. | 713/176 |
| 2013/0279698 A1 | 10/2013 | Bradley | |
| 2014/0007211 A1* | 1/2014 | Yang et al. | 726/7 |
| 2014/0181911 A1* | 6/2014 | Kula | 726/4 |

OTHER PUBLICATIONS

ROI Mobile Print User Guide, downloaded on Apr. 17, 2012 from http://www.roiprintmanager.com/documents/ROIMobilePrint_Manual.pdf.

"Seeing-Is-Believing: Using Camera Phones for human-Verifiable Authentication," downloaded on Apr. 17, 2012 from http://users.ece.cmu.edu/~jmmccune/papers/mccunej_believing.pdf.

"Validating and Securing Spontaneous Associations between Wireless Devices," downloaded on Apr. 20, 2012 from http://www.hpl.hp.com/techreports/2002/HPL-2002-256.pdf.

"Personal Printing Essentials," downloaded on Apr. 20, 2012 from http://www.kyoceradocumentsolutions.eu/index/document_solutions/cost_control_security/KYOCERA_-_ColourControl.-contextmargin-0489-files-78210-File.cpsdownload.tmp/Personal_Printing_2_0_en_Kyocera_07_12.

"Lexmark Mobile Printing White Paper," downloaded on Apr. 9, 2012 from http://www.lexmark.com/en_CA/solutions/business-solutions/mobile-print/Lexmark-Mobile-Printing-Whitepaper.pdf.

"UniFlow User Manual," accessed on Apr. 20, 2012, <http://www.nt-ware.com/mom/5.1/HTML/EN/index.html?mor_identifying_a_device_with_a_ba.htm>.

"Talking to Strangers: Authentication in Ad-Hoc Wireless Networks," downloaded on Jun. 10, 2012 from http://www.cs.cmu.edu/~hcwong/Pdfs/loclim.pdf.

\* cited by examiner

METHOD FOR ASSOCIATING AN IMAGE-FORMING DEVICE, A MOBILE DEVICE, AND A USER

BACKGROUND

1. Field of the Disclosure

The present disclosure relates generally to a method for associating an image-forming device, a mobile device, and a user.

2. Description of the Related Art

Image-forming devices, such as multifunction printers, have been in widespread use in the enterprise for some time. The use of mobile devices is increasing, and these mobile devices are rapidly becoming more prevalent in the enterprise today. The use of image-forming devices and mobile devices can provide convenience and improve productivity. The combination of the two can create even better efficiencies. However, the increased use of mobile devices by employees creates additional pressure on IT staff, due to the support that is required to integrate these devices into the enterprise. The problem is even more pronounced in environments where security is a concern.

SUMMARY

In one embodiment, a method for associating devices comprises receiving, at the first device, a request for establishing a connection with a second device, generating an optically-readable that encodes a first set of data, wherein the first set of data includes first key-derivation data, displaying the optically-readable code of the first set of data, establishing a communication channel with the second device, receiving a second set of data from the second device via the established communication channel, wherein the second set of data includes second key-derivation data, and wherein the second key-derivation data is generated in response to receiving the first key-derivation data at the second device, and determining the common key from the first key-derivation data and the second key-derivation data.

DETAILED DESCRIPTION

The following description is of certain illustrative embodiments, although other embodiments may include alternatives, equivalents, and modifications. Additionally, the illustrative embodiments may include several novel features, and a particular feature may not be essential to practice the devices, systems, and methods described herein.

Figure 1:
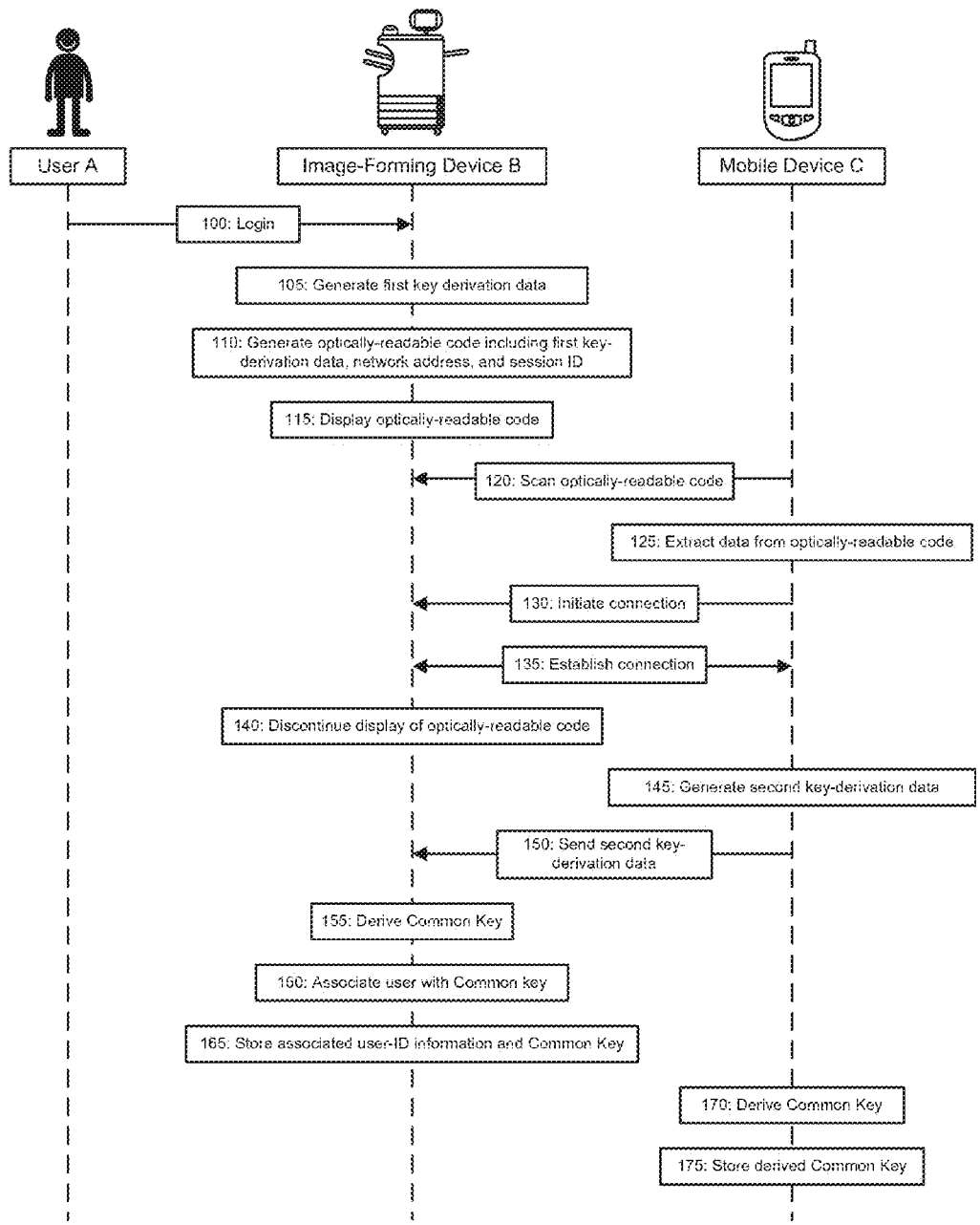
FIG. 1 is a flow diagram that illustrates an example embodiment of a method of associating an image-forming device, a mobile device, and a user.

FIG. 1 is a flow diagram that illustrates an example embodiment of a method of associating an image-forming device, a mobile device, and a user. The blocks of this method and the other methods described herein may be performed by one or more computing devices, for example the systems and devices described herein. Also, although this method and the other methods described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this method and the other methods described herein may omit blocks, add blocks, change the order of the blocks, combine blocks, or divide blocks into more blocks.

A user A is a user of an image-forming device B and a mobile device C. The image-forming device B is a multi-function peripheral that is configured to perform one or more of a plurality of functions, such as a print function, a scan function, a copy function, and facsimile function. The image-forming device B may include a display. The display may be configured to display text data or images to a user. Further, the display may be a display input device that displays a soft keyboard for receiving user inputs. In one embodiment, the display is a display-only device, and a keyboard and mouse may be separately provided. The display may be a touchscreen, a liquid-crystal display (LCD), or a touch panel through which a user may interact with the image-forming device B.

The image-forming device B may further include a card reader. The card reader is configured to read data content (e.g., user-identification (ID) information) recorded on a smart card (e.g., a government CAC or PIV card) or a proximity card. Further, in place of the card reader, a device that acquires user-ID information from other inputs, such as biometrics authentication and key inputs, may be used to receive user-ID information. In some embodiments, user-ID information is input via a display.

The mobile device C may be a mobile phone, a personal digital assistant (PDA), a tablet, or another computing device, which is capable of communicating via a network. The mobile device C may include at least one display that is capable of rendering images, may include an image-capturing device that is capable of capturing images (e.g., an optically-readable code), or may include a mobile application that is capable of decoding the captured image.

Beginning in block 100, the user A logs into the image-forming device B by inputting user-ID information into the image forming device B. The user may input the user-ID information by swiping a smart card that contains the user-ID information of the user through a card reader; by holding a contactless smart card over a card reader; or by inputting the user-ID information via a keyboard, mouse, or a soft keyboard shown on the display of the image-forming device B. Then, the image-forming device B may communicate with a server (e.g., an authentication server) to authenticate the user A according to the input user-ID information. If the user A is authenticated, the user A is allowed to access the image-forming device B, and the user-ID information of the user A is stored in the image-forming device B. In some embodiments, the user A has limited access to the image-forming device B based on the user's authorization level. For example, the user A may have access to the entire functionality of the image-forming device B and the applications thereon, or the user A may have only limited access to the functionality of the image-forming device B and the applications thereon.

Next, in block 105, the image forming device B generates the first key-derivation data. The key-derivation data includes data for deriving a common key between the image-forming device B and the mobile device C. Further, the first key-derivation data may be a randomly-generated unique code.

In block 110, the image-forming device B generates an optically-readable code (e.g., a quick-response (QR) code, a barcode) and encodes at least the first key-derivation data, a network address of the image-forming device B, and a session identifier (ID) into the optically-readable code. The network address of the image-forming device B may be a hostname, such as a DNS or WINS name of the image-forming device B; may be a device uniform resource locator (URL) or domain name of the image-forming device B; and may be an Internet Protocol (IP) address of the image-forming device B. The session ID is a unique identifier that identifies a session.

Then, in block 115, the image-forming device B displays the optically-readable code that was generated in block 110 on the display. The generation and display of the optically-readable code may be invoked by the user A selecting an application (e.g., a Multi-Functional Embedded Application Platform (MEAP) application) on the image-forming device B. In another embodiment, the application on the image-forming device B is automatically launched upon a user logging into the image-forming device B. For example, when the user A logs into the image-forming device B, a determination is made whether a common key that is associated with the user A exists or not. If a common key is not associated with the user A, then the application generates and displays the optically-readable code. In some embodiments, a button is provided for the user A to press to reveal the optically-readable code on the display. The button may be a physical button on the image-forming device B or a soft key on the display of the image-forming device B.

Moving to block 120, the user A scans the optically-readable code that is displayed on the display of the image-forming device B using the mobile device C. The user A launches a mobile application on the mobile device C to scan the optically-readable code. In one embodiment, the user A selects a menu item on the mobile application to pair the mobile device with the image-forming device B. Upon selection of the menu item, the mobile application sets up a camera to allow the user A to capture the optically-readable code.

In block 125, the mobile application on the mobile device C extracts and decodes the data encoded in the optically-readable code. Next, in block 130, the mobile application on the mobile device C initiates a connection to the image-forming device B using the network address of the image-forming device B extracted from the optically-readable code. Then, in block 135, a connection is established between the mobile device C and the image-forming device B. In one embodiment, when the connection is established, the mobile device C may obtain information of the image-forming device B, such as device capabilities, the model, and the device name of the image-forming device B, via the connection. Further, the information obtained by the mobile device C may be used for discovering the image-forming device B via a network for future communications.

In block 140, the image-forming device B discontinues the display of the optically-readable code. For example, the image-forming device B may discontinue the display of the optically-readable code upon establishing a connection with the mobile device C or after a predetermined period of time.

Moving to block 145, the mobile device C generates the second key-derivation data. Similar to the aforementioned first key-derivation data, the second key-derivation data may be a randomly-generated unique code.

Then, in block 150, the mobile device C sends the second key-derivation data and sends the session ID that was extracted and decoded from the optically-readable code to the image-forming device B over the connection that was established in block 135.

In block 155, the image-forming device B derives the common key from the first key-derivation data and the second key-derivation data, which was received from the mobile device C. In block 160, the image-forming device B associates the user-ID information of the user A with the common key that was derived in block 155. Then, in block 165, the associated user-ID information and the common key are stored in the image-forming device B.

In block 170, the mobile device C derives the common key from the first key-derivation data and the second key-derivation data. Finally, in block 175, the mobile device C stores the common key that was derived in block 170.

In one embodiment, the common key is used to encrypt or sign any subsequent communications between the image-forming device B and the mobile device C. In another embodiment, one or more additional keys are derived from the common key, using techniques known in the art, and the derived keys are used to encrypt or sign subsequent communications between the image-forming device B and the mobile device C. For example, the techniques known in the art include, but are not limited to, computing hashes of previous keys mixed with a counter or other data.

Figure 2:
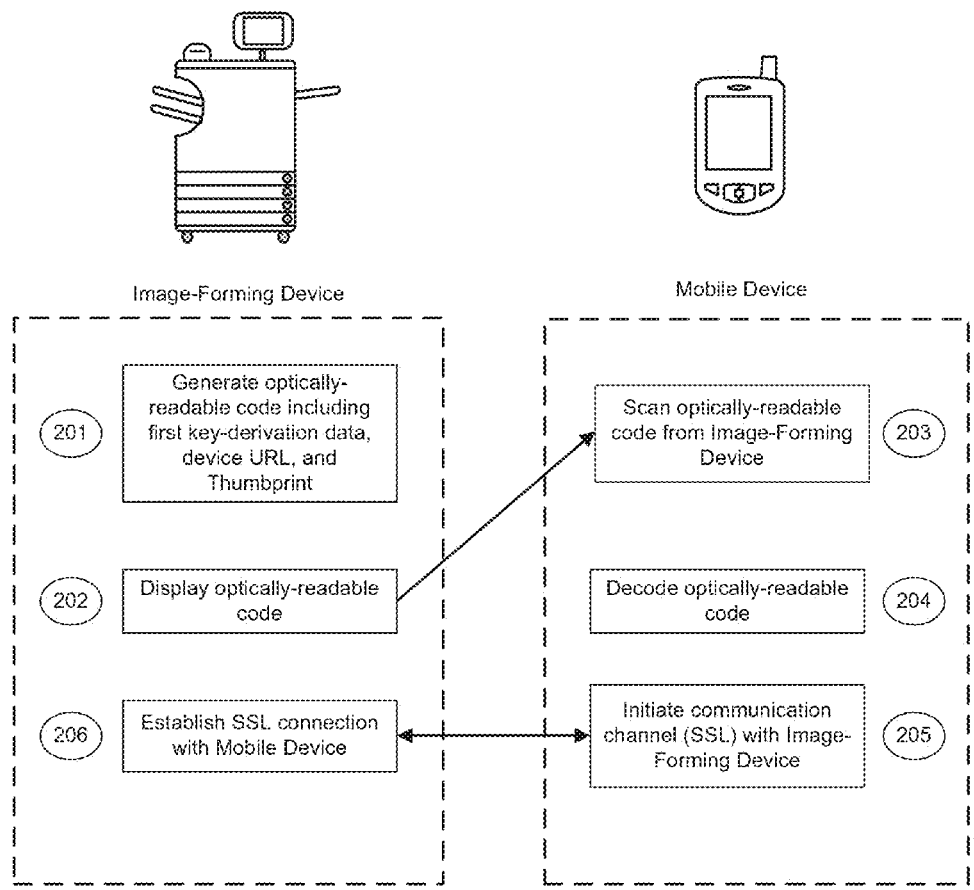
FIG. 2 is a block diagram that illustrates an example embodiment of the establishment of a connection between an image-forming device and a mobile device.

FIG. 2 is a block diagram that illustrates an example embodiment of the establishment of a connection between an image-forming device and a mobile device. The connection may be a Secure Sockets Layer (SSL) connection or a Transport Layer Security (TLS) connection, for example. When a user (e.g., the user A) logs into and is authenticated at an image-forming device B, the first key-derivation data is generated at the image-forming device B.

Starting in block 201, an image-forming device B generates an optically-readable code that includes first key-derivation data, a device URL, a session ID, and a certificate hash (e.g., a thumbprint or a fingerprint). In block 202, the optically-readable code is displayed on a display of the image-forming device B. Then, in block 203, the optically-readable code is scanned by a mobile device C via a scanner or a camera and, in some embodiments, a customized mobile application that has been installed on the mobile device. In block 204, the optically-readable code is decoded by the mobile device C (e.g., the customized mobile application on the mobile device).

Then, in block 205, a secure communication channel (e.g., the SSL connection) to the image-forming device B is initiated by the mobile device C. In one embodiment, if the mobile device C holds a root certificate, the mobile device C uses industry-standard certificate validation to securely connect (e.g., via an SSL connection) to the image-forming device B. Industry-standard certificate validation includes the following as part of the validation process, among other checks: validation of the integrity of the certificate by means of a digital-signature validation, and validation of the certificate common name by comparing the common name of the certificate to the name that was used to access the device (e.g., a URL). In another embodiment, if the mobile device C does not have a root certificate, the mobile device C uses the certificate hash from the optically-readable code to ensure that the certificate has not been tampered with in transit, thus allowing the mobile device C to securely connect (e.g., via an SSL connection) with the image-forming device B.

Finally, in block 206, a secure connection is established between the image-forming device B and the mobile device C.

Figure 3:
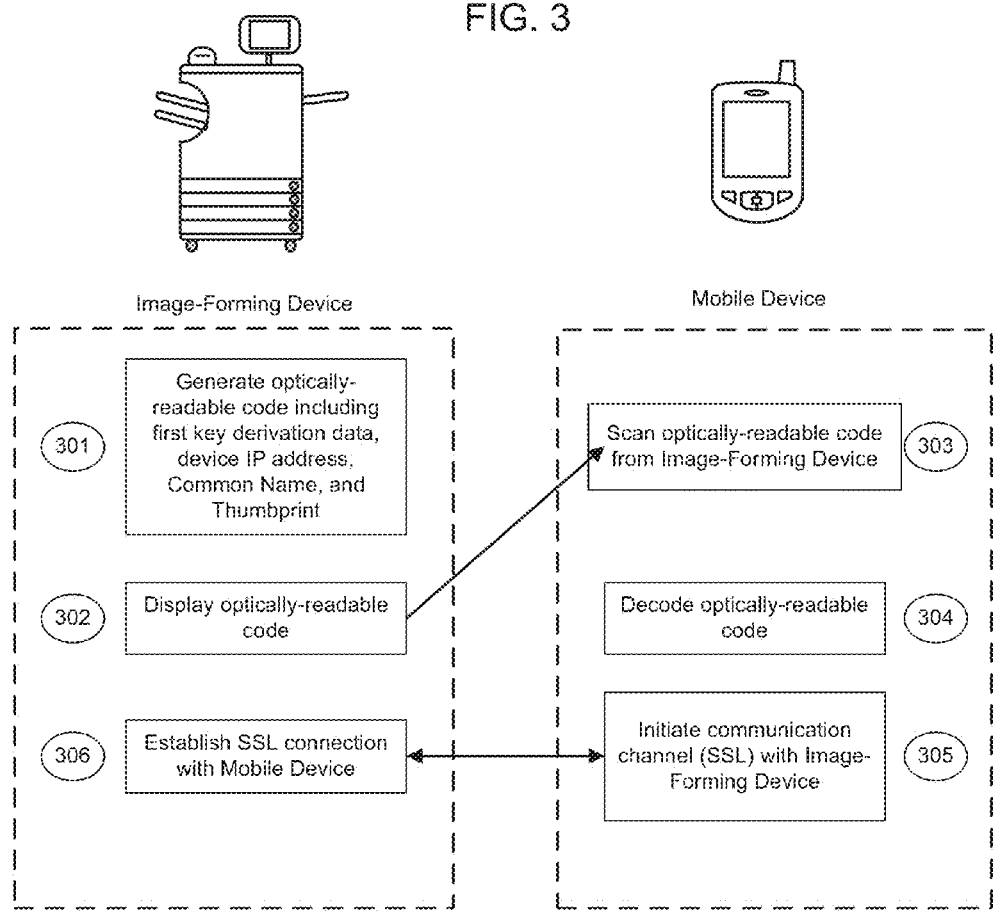
FIG. 3 is a block diagram that illustrates an example embodiment of the establishment of connection between an image-forming device and a mobile device.

FIG. 3 is a block diagram that illustrates an example embodiment of the establishment of a connection between an image-forming device B and a mobile device B. The connection may be a Secure Sockets Layer (SSL) connection or a Transport Layer Security (TLS) connection, for example. When a user (e.g., the user A) logs into and is authenticated at an image-forming device B, the first key-derivation data is generated at the image-forming device B.

Starting in block 301, an image-forming device B generates an optically-readable code and embeds the first key-derivation data and one or more of a device IP address (e.g., a URL that is based on the IP address), a common name, a session ID, and a certificate hash (e.g., a thumbprint or a fingerprint) in the optically-readable code. In block 302, the optically-readable code is displayed on a display of the image-forming device B. Then, in block 303, the optically-readable code is scanned by a mobile device C, for example by an application that has been installed in the mobile device C. In block 304, the optically-readable code is decoded by the mobile device C (e.g., the application on the mobile device).

Next, in block 305, a secure communication channel (e.g., the SSL connection) to the image-forming device B is initiated by the mobile device C. In one embodiment, if the mobile device C holds a root certificate, then the mobile device C uses the common name that was contained in the optical code during the process of validating the certificate, thus initiating a secure connection with the image-forming device B. The common name that was contained in the optical code is used in this case because the URL that was used to connect to the image-forming device B was based on an IP address, rather than a name (e.g., a device name or DNS name). In some embodiments, if the mobile device C has the image-forming device's IP address but does not hold a root certificate, then the mobile device C uses the certificate hash from the optically-readable code to ensure that the certificate has not been tampered with in transit, thus allowing the mobile device C to securely connect (e.g., via an SSL connection) with the image-forming device B.

Finally, in block 306, a secure connection is established between the image-forming device B and the mobile device C. When establishing the secure connection, the mobile device C verifies the thumbprint of the image-forming device B.

Figure 4:
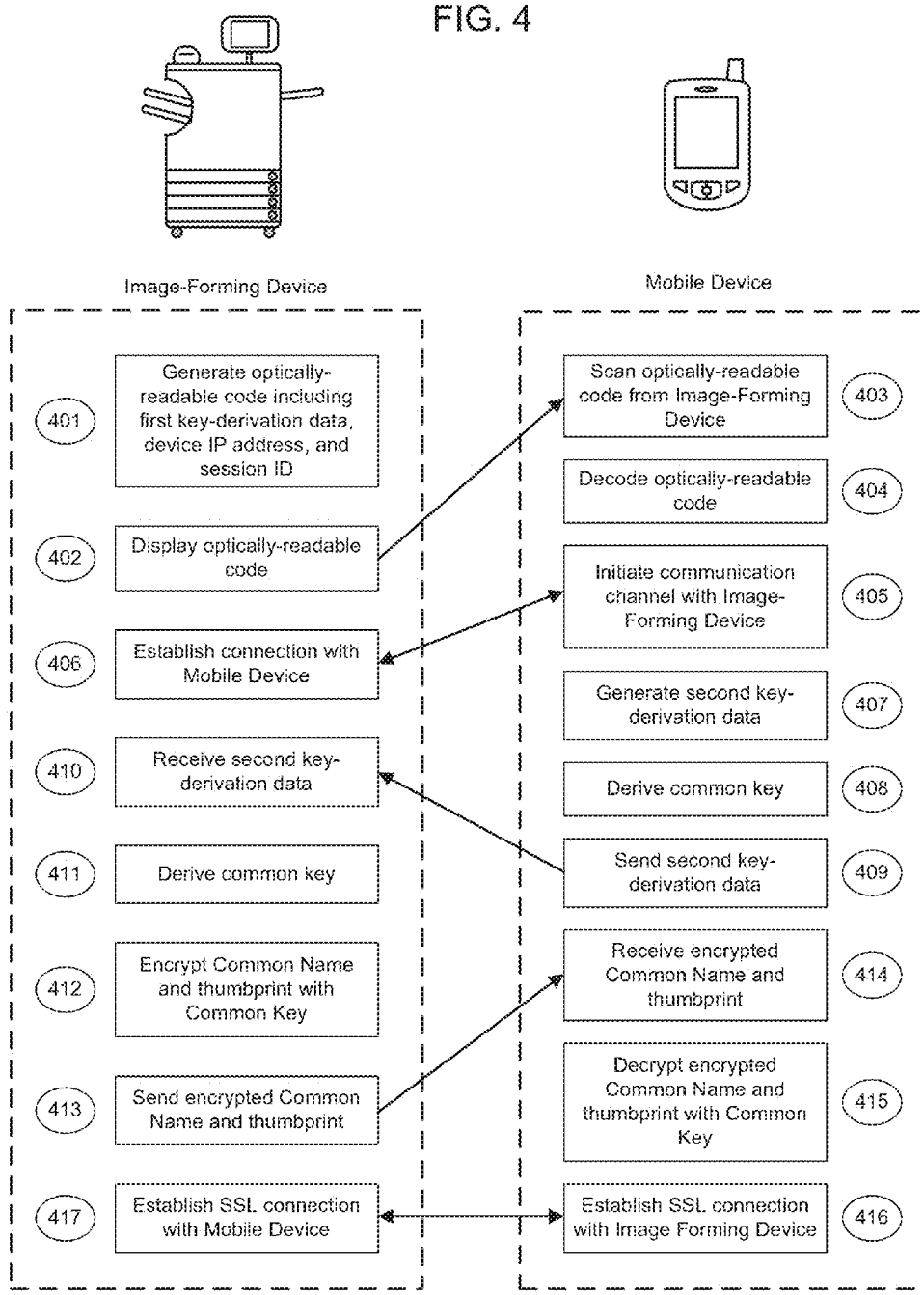
FIG. 4 is a block diagram that illustrates an example embodiment of the establishment of a connection between an image-forming device and a mobile device.

FIG. 4 is a block diagram that illustrates an example embodiment of the establishment of a connection between an image-forming device B and a mobile device C. When a user (e.g., the user A) logs in and is authenticated at an image-forming device B, the first key-derivation data is generated at the image-forming device B.

Starting in block 401, an image-forming device B generates an optically-readable code. If the data-storage capacity of the optically-readable code is insufficient to store data necessary to establish a secure connection, the amount of data transferred over the optically-readable code may be limited. For example, the common name of the certificate may be very long, causing the data to be stored on and transferred over the optically-readable code to exceed the storage capacity of the optically-readable code. In such a case, the first key-derivation data, a device IP address (e.g., a URL based on the IP address), and a session ID are embedded in the optically-readable code. In block 402, the optically-readable code is displayed on a display of the image-forming device B. Then, in block 403, the optically-readable code is scanned by a mobile device C, for example by a mobile application installed on the mobile device C. In block 404, the optically-readable code is decoded by the mobile application on the mobile device C.

Then, in block 405, a communication channel to the image-forming device B is initiated by the mobile device C using the image-forming device's IP address, which was provided in the optically-readable code. Since the optically-readable code did not include a common name or a certificate hash for establishing a secure connection, the communication channel initiated by the mobile device C in block 405 may be a non-secure connection. In block 406, a connection is established between the image-forming device B and the mobile device C.

Next, in block 407, the mobile device C generates the second key-derivation data. In block 408, the mobile device derives a common key from the received first key-derivation data and the generated second key-derivation data. Then, in block 409, the mobile device C sends the second key-derivation data to the image-forming device B via the established connection.

In block 410, the second key-derivation data is received by the image-forming device B. Then, in block 411, the image-forming device B derives the common key from the first key-derivation data and the second key-derivation data. In block 412, using the derived common key, the image-forming device B encrypts a common name and a certificate hash, which may be used to establish an SSL connection between the mobile device C and the image-forming device B. In block 413, the image-forming device B sends the encrypted information to the mobile device C via the established connection.

Then, in block 414, the mobile device C receives the encrypted common name and the certificate hash. In block 415, the mobile device C decrypts the common name and the certificate hash using the common key derived in block 408. In block 416, the mobile device C initiates a secure connection with the image forming device B. By using the common name as part of the certificate-validation process, a secure connection may be initiated. However, if the mobile device C does not hold a root certificate, the certificate hash is used to ensure that the certificate has not been tampered with in transit, thus allowing the mobile device C to securely connect (e.g., via an SSL connection) with the image-forming device B. Finally, in block 417, the secure connection is established between the image-forming device B and the mobile device C.

Figure 5:
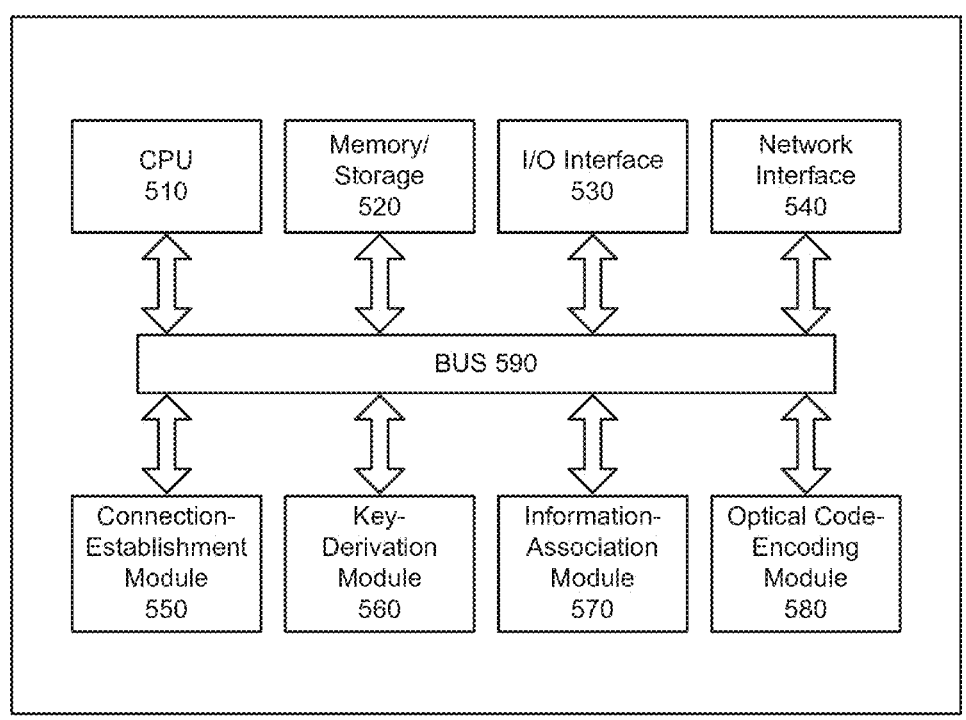
FIG. 5 is a block diagram that illustrates an example embodiment of the components of an image-forming device.

FIG. 5 is a block diagram that illustrates an example embodiment of the components of an image-forming device B. The image-forming device B includes one or more processors (CPU) 510, a memory/storage 520, one or more I/O interfaces 530, a network interface 540, a connection-establishment module 550, a key-derivation module 560, an information-association module 570, an optical-code-encoding module 580, and a bus 590.

The CPU 510 includes one or more central processing units, which include microprocessors (e.g., a single core microprocessor, a multi-core microprocessor) or other circuits, and is configured to read and perform computer-executable instructions, such as instructions stored in storage or in memory (e.g., software in modules that are stored in storage or memory). The computer-executable instructions may include those for the performance of the operations described herein.

The memory/storage 520 includes one or more computer-readable or computer-writable storage media. A computer-readable storage medium, as opposed to mere transitory, propagating signals, includes a tangible article of manufacture, for example a magnetic disk (e.g., a floppy disk, a hard disk), an optical disc (e.g., a CD, a DVD, a Blu-ray), a magneto-optical disk, magnetic tape, or semiconductor memory (e.g., a non-volatile memory card, flash memory, a solid-state drive, SRAM, DRAM, EPROM, EEPROM).

The storage/memory 520 is configured to store computer-readable data or computer-executable instructions. The one or more I/O interfaces 530 include communication interfaces to input and output devices, which may include a display, a card reader, a keyboard, a mouse, a light pen, an optical-storage device, a printer, a scanner, a microphone, a camera, and a drive.

The network interface 540 is configured to allow the image-forming device B to communicate with other devices via a network (wired or wireless).

The connection-establishment module 550 may be a data structure that includes computer-readable instructions that, when executed by the image forming device B, cause the image forming device B to establish a connection with other devices after the connection is initiated by the other devices. The connection established by the connection-establishment module 550 may be a non-secure connection or a secure connection (e.g., an SSL connection or a TLS connection).

The key-derivation module 560 is configured to generate first key-derivation data, receive second key-derivation data, and derive a common key from the first key-derivation data and the second key-derivation data.

The information-association module 570 is configured to associate a user of the image-forming device B and mobile device (e.g., the mobile device C in FIG. 1, the mobile device C in FIG. 2, the mobile device C in FIG. 3, the mobile device C in FIG. 4) with the common key derived by the key-derivation module 560.

The optical-code-encoding module 580 is configured to encode data into an optically-readable code. The data encoded into the optically-readable code may vary according to the environment or capabilities of the image-forming device B and the mobile device C.

The bus 590 is configured to allow the components of the image-forming device B communicate with each other.

The above described devices, systems, and methods can be implemented by supplying one or more computer-readable media having stored thereon computer-executable instructions for realizing the above described operations to one or more computing devices that are configured to read the computer-executable instructions and execute them. In this case, the systems or devices perform the operations of the above-described embodiments when executing the computer-executable instructions. Also, an operating system on the one or more systems or devices may implement the operations of the above described embodiments. Thus, the computer-executable instructions or the one or more computer-readable media storing the computer-executable instructions thereon constitute an embodiment.

Any applicable computer-readable medium (e.g., a magnetic disk (including a floppy disk, a hard disk), an optical disc (including a CD, a DVD, a Blu-ray disc), a magneto-optical disk, a magnetic tape, and a solid state memory (including flash memory, DRAM, SRAM, a solid state drive)) can be employed as a computer-readable medium for the computer-executable instructions. The computer-executable instructions may be written to a computer-readable medium provided on a function-extension board inserted into the device or on a function-extension unit connected to the device, and a CPU provided on the function-extension board or unit may implement the operations of the above-described embodiments.

While the above disclosure describes certain illustrative embodiments, the invention is not limited to the above-described embodiments, and the following claims include various modifications and equivalent arrangements within their scope.

What is claimed is:

1. A method for associating devices, the method comprising:
   receiving, at a first device, user-identification information;
   determining whether the user-identification information is associated with a common key;
   in response to determining that the user-identification information is not associated with the common key, generating an optically-readable code that encodes a first set of data, wherein the first set of data includes at least first key-derivation data, a network address of the first device, and session-identification information;
   displaying the optically-readable code of the first set of data;
   establishing a connection with a second device;
   receiving a second set of data from the second device via the established connection, wherein the second set of data includes at least second key-derivation data, and wherein the second key-derivation data is generated in response to receiving the first key-derivation data at the second device;
   determining the common key from the first key-derivation data and the second key-derivation data;
   encrypting, at the first device, secure-connection establishing data using the common key;
   sending the secure-connection establishing data from the first device to the second device via the established connection;
   decrypting, at the second device, the secure-connection establishing data using the common key; and
   establishing a secure connection using the decrypted secure-connection establishing data.

2. The method of claim 1, further comprising:
   establishing an association between the user-identification information and the common key; and
   storing the association at the first device.

3. The method of claim 1, further comprising providing an indication for indicating that the connection between the first device and the second device has been established.

4. The method of claim 1, wherein the secure-connection establishing data includes a common name and a certificate hash.

5. One or more non-transitory computer-readable media storing computer-executable instructions that, when executed by one or more computing devices, cause the one or more computing devices to perform operations comprising:
   receiving, at a first device, user-identification information;
   determining whether the user-identification information is associated with a common key;
   in response to determining that the user-identification information is not associated with the common key, generating an optically-readable code that encodes a first set of data, wherein the first set of data includes at least first key-derivation data, a network address of the first device, and session-identification information;
   displaying the optically-readable code of the first set of data;
   establishing a connection with a second device;
   receiving a second set of data from the second device via the established connection, wherein the second set of data includes at least second key-derivation data, and wherein the second key-derivation data is generated in response to receiving the first key-derivation data at the second device;

determining the common key from the first key-derivation data and the second key-derivation data;

encrypting, at the first device, secure-connection establishing data using the common key;

sending the secure-connection establishing data from the first device to the second device via the established connection;

decrypting, at the second device, the secure-connection establishing data using the common key; and establishing a secure connection using the decrypted secure-connection establishing data.

6. The one or more non-transitory computer-readable media of claim 5, further comprising:

establishing an association between the user-identification information and the common key; and storing the association at the first device.

7. The one or more non-transitory computer-readable media of claim 5, further comprising providing an indication for indicating that the connection between the first device and the second device has been established.

8. The one or more non-transitory computer-readable media of claim 5, wherein the secure-connection establishing data includes a common name and a certificate hash.

9. A system for associating devices, the system comprising:

a receiver for receiving user-identification information;

at least one non-transitory computer-readable medium; and at least one processor in communication with the at least one non-transitory computer-readable medium, the at least one processor configured to:

determine whether the user-identification information is associated with a common key;

generate, in response to the determining that the user-identification information is not associated with a common key, an optically-readable code that encodes a first set of data, wherein the first set of data includes at least first key-derivation data, a network address of the first device, and session-identification information;

display the optically-readable code of the first set of data;

establish a connection with a second device;

receive a second set of data from the second device via an established connection, wherein the second set of data includes at least second key-derivation data, and wherein the second key-derivation data is generated in response to receiving a first key-derivation data at the second device;

derive the common key from the first key-derivation data and the second key-derivation data;

encrypt, at the first device, secure-connection establishing data using the common key;

send the secure-connection establishing data from the first device to the second device via the established connection;

decrypt, at the second device, the secure-connection establishing data using the common key; and establish a secure connection using the decrypted secure-connection establishing data.

\* \* \* \* \*